United States Patent [19]

Balaban et al.

[11] 4,456,922

[45] Jun. 26, 1984

[54] REDUCED DATA RATE COMB FILTER SYSTEM

[75] Inventors: Alvin R. Balaban, Lebanon; Steven A. Steckler, Clark, both of N.J.

[73] Assignee: RCA Corporation, New York, N.Y.

[21] Appl. No.: 405,171

[22] Filed: Aug. 4, 1982

[51] Int. Cl.³ .......................................... H04N 9/535
[52] U.S. Cl. ................................................. 358/31
[58] Field of Search ........................................ 358/31

[56] References Cited

U.S. PATENT DOCUMENTS 3,858,240 12/1974 Golding et al. .
4,322,739 3/1982 Drewery et al. .
4,400,718 8/1983 Lee ......................................... 358/13

FOREIGN PATENT DOCUMENTS 2050746A 1/1981 United Kingdom .

OTHER PUBLICATIONS

"Sub-Nyquist-Encoded PCM NTSC Color Television" by John P. Rossi, pub. in Jan. 1976, SMPTE Journal, vol. 85, No. 1.
"A Discussion of Sampling Theorems" by D. A. Linden, pub. in Jul. 1959, Proceedings of the IRE.
"Digivision" ITT Semiconductor Development Data, Aug. 1982.
T. Fischer, "What is the Impact of Digital TV", IEEE Transactions on Consumer Electronics, vol. CE-28, No. 3, Aug. 1982, pp. 423-429.

Exhibit "A", Digit 2000 VLSI Digital TV System, ITT Semiconductor, (Confidential).

*Primary Examiner*—Richard Murray
*Attorney, Agent, or Firm*—E. M. Whitacre; P. J. Rasmussen; E. P. Herrmann

[57] ABSTRACT

Comb filter arrangements are provided for separating frequency interleaved signal components of a video signal. A video signal is sampled at a rate which satisfies the Nyquist criterion for the bandwidth of the signal, and the resultant signal samples are applied to a bandpass filter. The bandpass filter produces a filtered signal restricted to a portion of the original video band. The filtered signal is subsampled at a rate which satisfies the Nyquist criterion for the information of the restricted passband, producing replicas of the restricted passband beginning approximately at zero Hertz and extending upward in frequency about frequencies which are multiples of the subsampling frequency and its harmonics. The subsampled information in the replicated passbands is comb filtered, and the comb filtered signals are interpolated up to the original sampling rate of the video signal. The comb filtered and interpolated signals are applied to a second bandpass filter exhibiting substantially the same passband as the first bandpass filter. The signals produced by the second bandpass filter are then combined in time alignment with samples of the original video signal to produce a second comb filtered signal.

11 Claims, 14 Drawing Figures

REDUCED DATA RATE COMB FILTER SYSTEM

This invention relates to signal separation systems and, in particular, to a comb filter arrangement for separating the luminance and chrominance components of a digitized video signal at a reduced data rate.

Conventional television broadcast systems are arranged so that much of the brightness (luminance) information contained in an image is represented by signal frequencies which are concentrated about integral multiples of the horizontal line scanning frequency. Color (chrominance) information is encoded and inserted in a portion of the luminance signal spectrum around frequencies which lie halfway between the multiples of the line scanning frequency (i.e., at odd multiples of one-half the line scanning frequency).

Chrominance and luminance information can be separated by appropriately combing the composite signal spectrum. Known combing arrangements take advantage of the fact that the odd multiple relationship between chrominance signal components and half the line scanning frequency causes the chrominance signal components for corresponding image areas on successive lines to be 180° out of phase with each other. Luminance signal components for corresponding image areas on successive lines are substantially in phase with each other.

In a comb filter system, one or more replicas of the composite image-representative signal are produced which are time delayed from each other by at least one line scanning interval (a so-called one-H delay). The signals from one line are added to signals from a preceding line, resulting in the cancellation of the chrominance components, while reinforcing the luminance components. By subtracting the signals of two successive lines (e.g., by inverting the signals of one line and then combining the two), the luminance components are cancelled while the chrominance components are reinforced. Thus, the luminance and chrominance signals may be mutually combed and thereby may be separated advantageously.

Concurrently filed U.S. patent application (Ser. No. 78,334) describes comb filter arrangements suitable for comb filtering an NTSC composite video signal over an asymmetrical passband located about the color subcarrier frequency. The asymmetrical passband includes the color signal information represented by modulated I and Q color mixture signals. The Q signal is modulated as a double sideband signal of the color subcarrier frequency, and extends from about 3.1 MHz to 4.1 MHz. The I signal is modulated as both a single and double sideband signal of the color subcarrier frequency, extending from about 2.1 MHz to 4.2 MHz. The comb filtered chrominance signals produced by the arrangements of this patent application thus contain all of the modulated color information of the NTSC signal.

However, it is also possible to reproduce a color television signal using only the double sideband modulated information of the I and Q signals, which extends from about 3.1 MHz to 4.2 MHz. The double sideband signals are usually processed and demodulated relative to the in-phase and quadrature phases of the color subcarrier signal, reproducing the (B-Y) and (R-Y) color difference signals. The embodiments of the aforementioned patent application are advantageous in that fewer storage locations are required for the one-H comb filter delay line than those used in prior art arrangements. By using the narrower passband of the (B-Y) and (R-Y) color difference signals, however, it has been discovered that an even greater reduction in the number of storage locations for the one-H comb filter delay line may be achieved. Furthermore, comb filter arrangements constructed in accordance with the principles of the present invention may also provide a reduction in the complexity of the clock signal circuitry required by the system.

In accordance with the principles of the present invention, comb filter arrangements are provided for separating frequency interleaved signal components of a video signal. A video signal is sampled at a rate which satisfies the Nyquist criterion for the bandwidth of the signal, and the resultant signal samples are applied to a bandpass filter. The bandpass filter produces a filtered signal restricted to a portion of the original video band. The filtered signal is subsampled at a rate which satisfies the Nyquist criterion for the information of the restricted passband, producing replicas of the restricted passband beginning approximately at zero Hertz and extending upward in frequency about frequencies which are multiples of the subsampling frequency and its harmonics. The subsampled information in the replicated passbands is comb filtered, and the comb filtered signals are interpolated up to the original sampling rate of the video signal. The comb filtered and interpolated signals are applied to a second bandpass filter exhibiting substantially the same passband as the first bandpass filter. The signals produced by the second bandpass filter are then combined in time alignment with samples of the original video signal to produce a second comb filtered signal.

Figure 5:
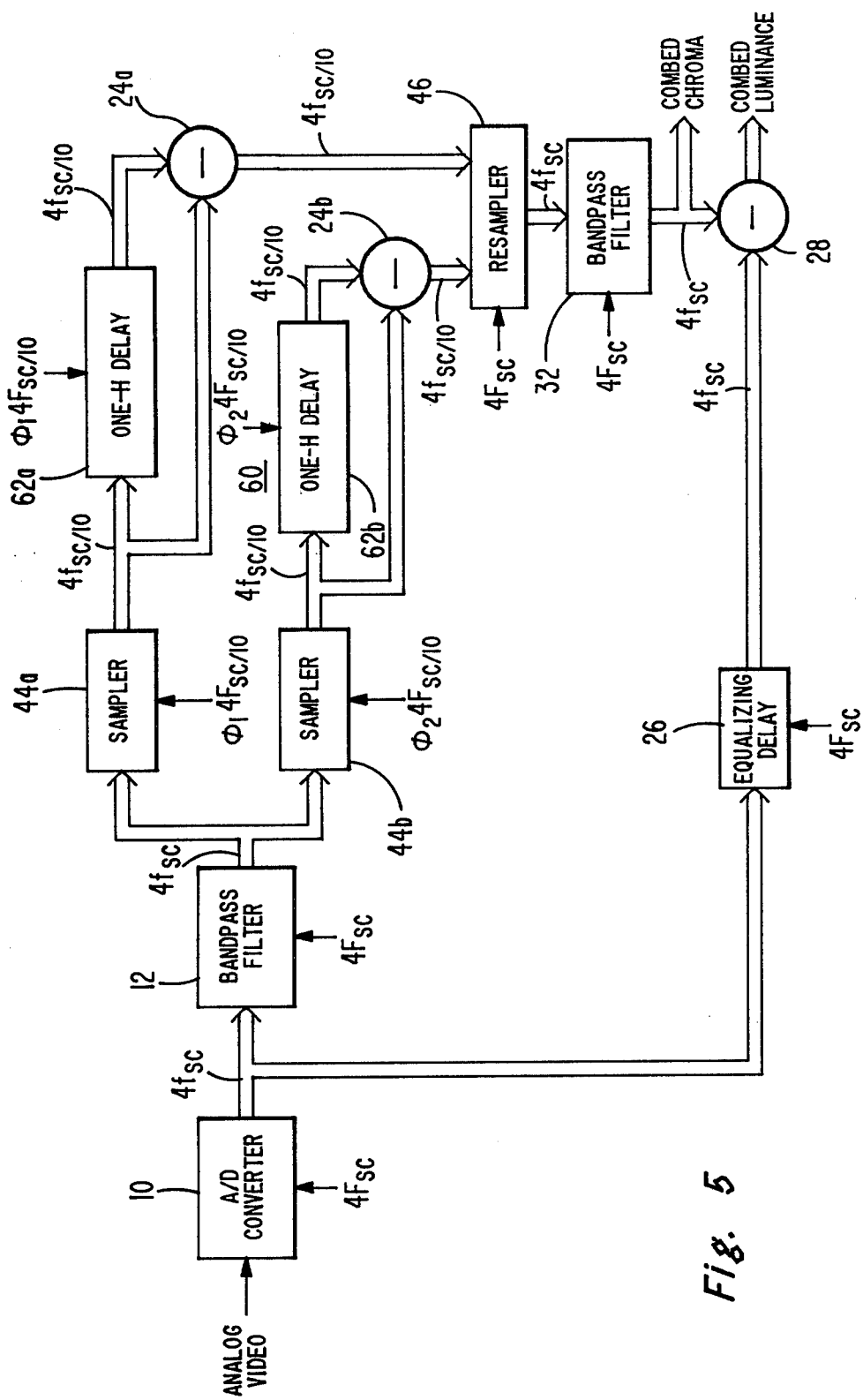
FIG. 5 illustrates in block diagram form a fourth comb filter arrangement constructed in accordance with the principles of the present invention, in which two one-H delay lines are clocked at one-tenth the rate of the input video signal sample sequence.
Figure 6A:
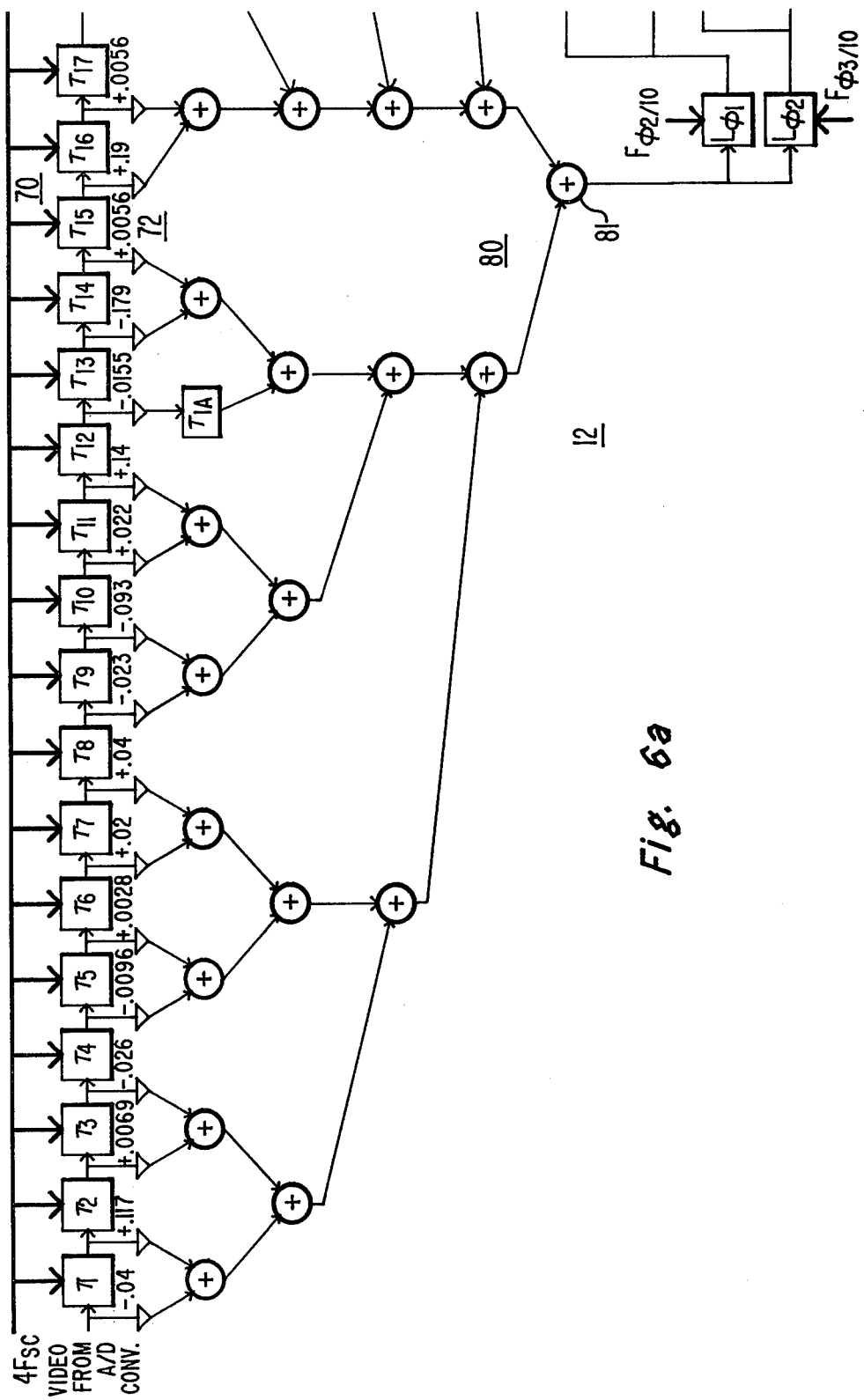
Figure 6B:
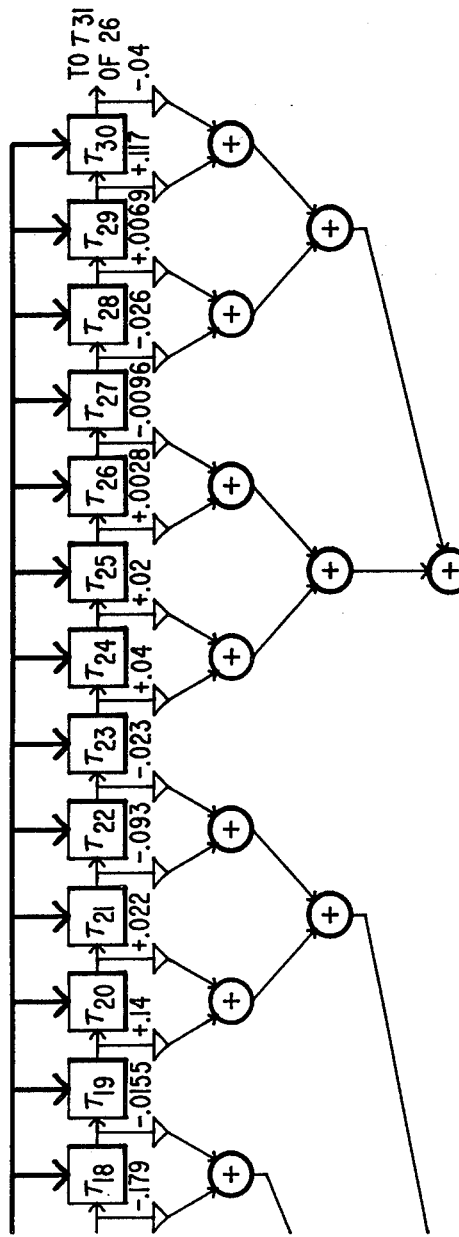
Figure 6B:
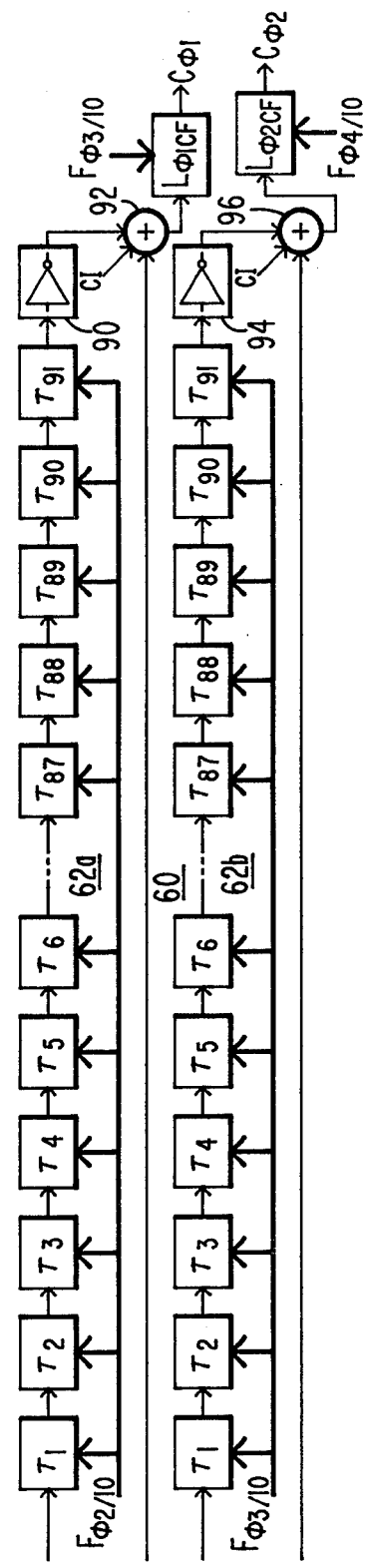
Figure 7:
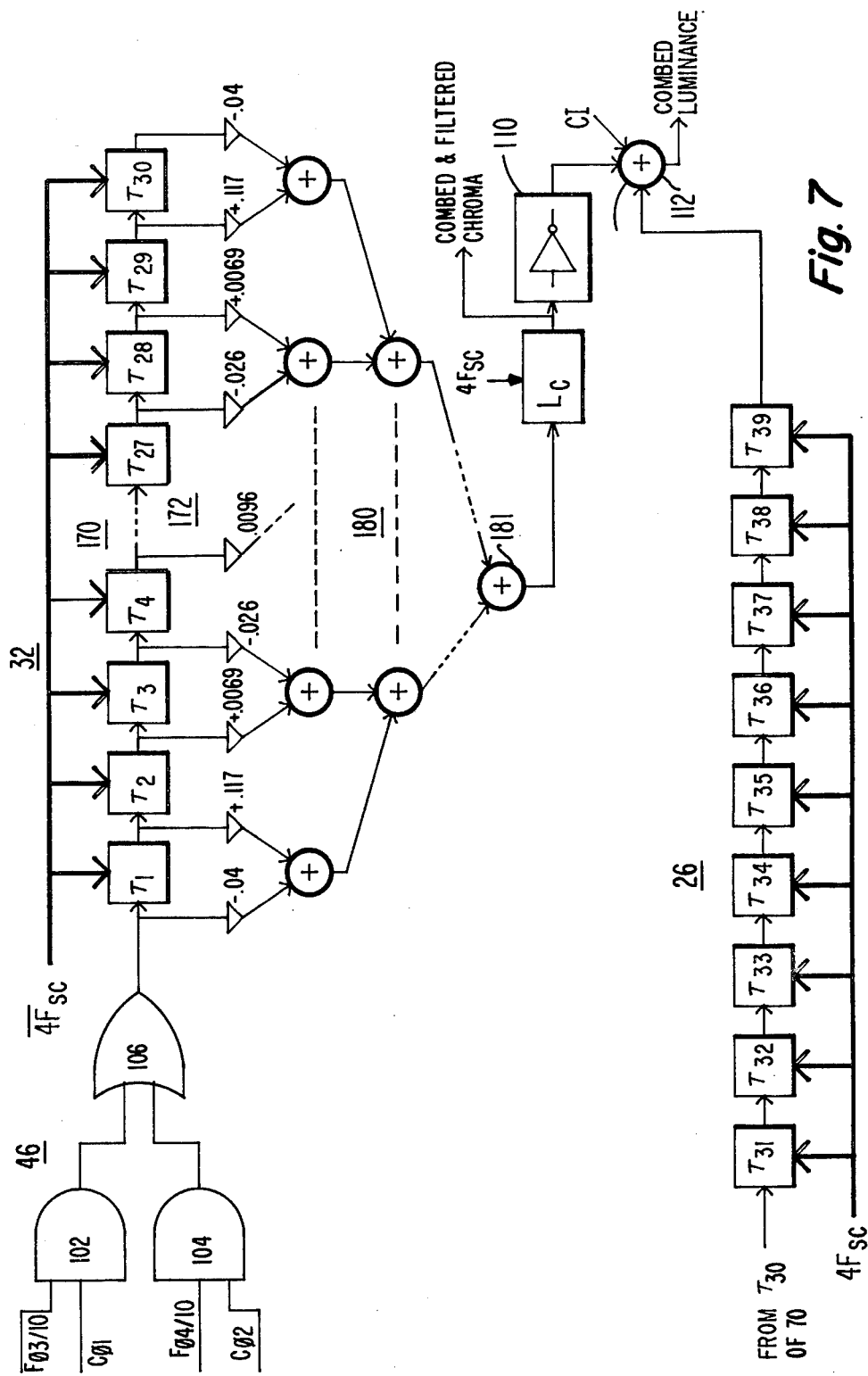
Figure 8:
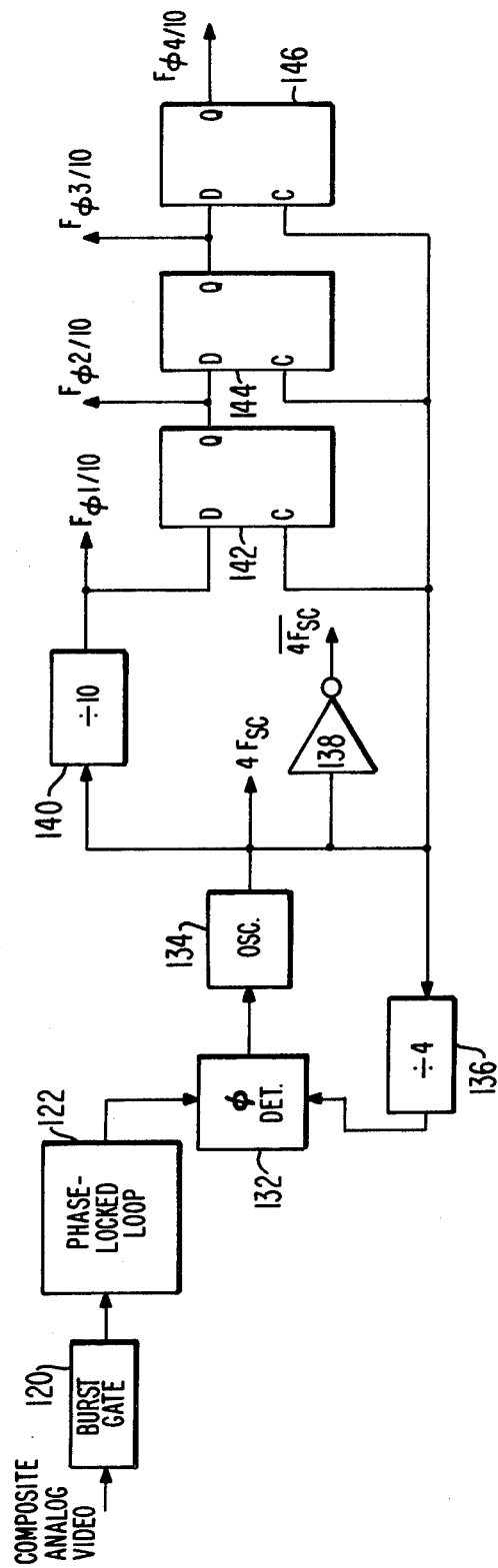
Figure 9:
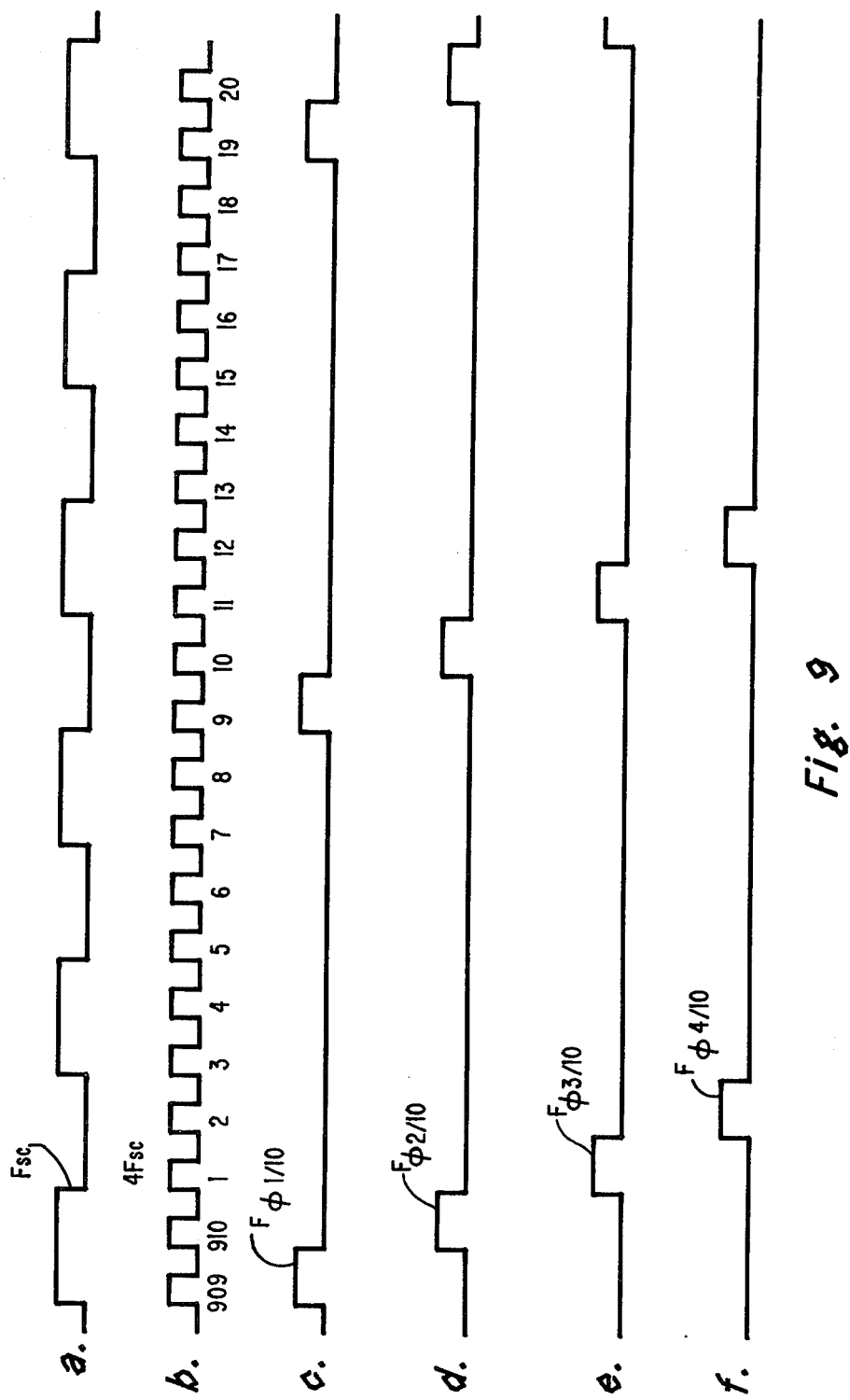
Figure 10:
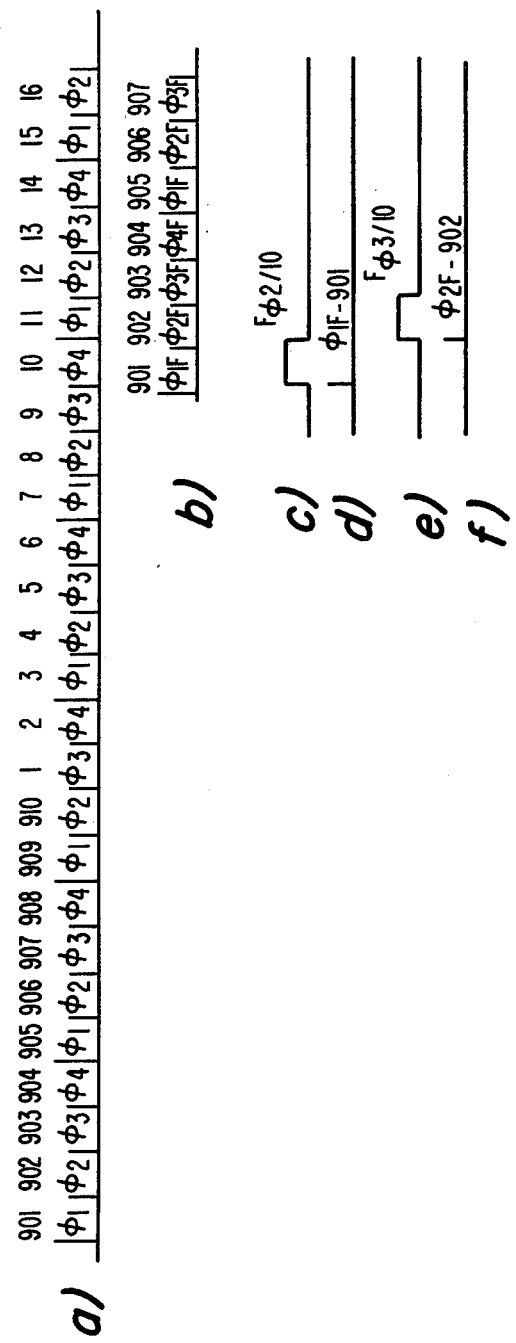
Figure 11:
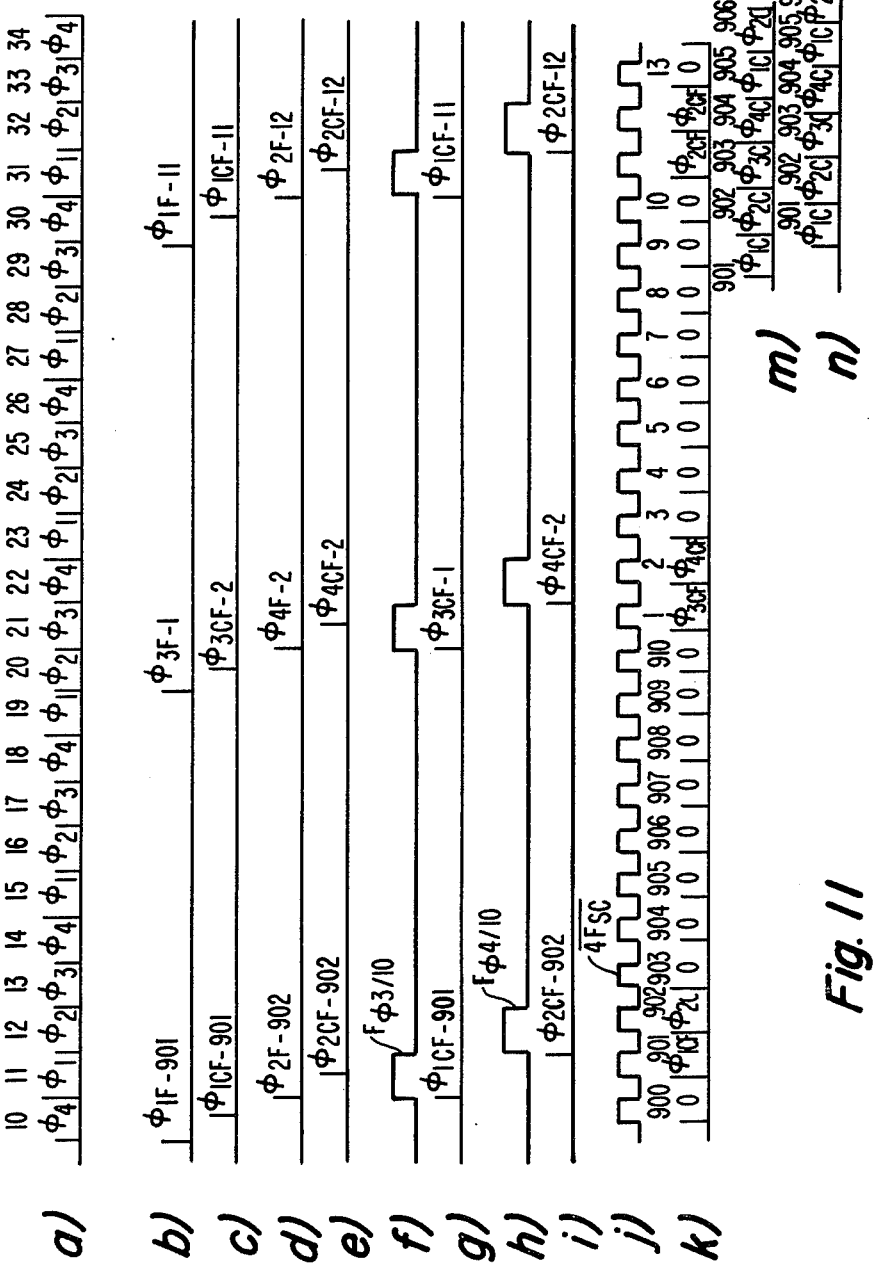
Figure 12:
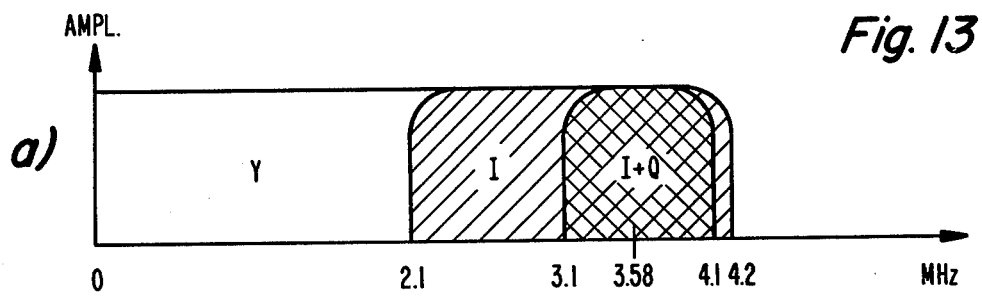
Figure 13:
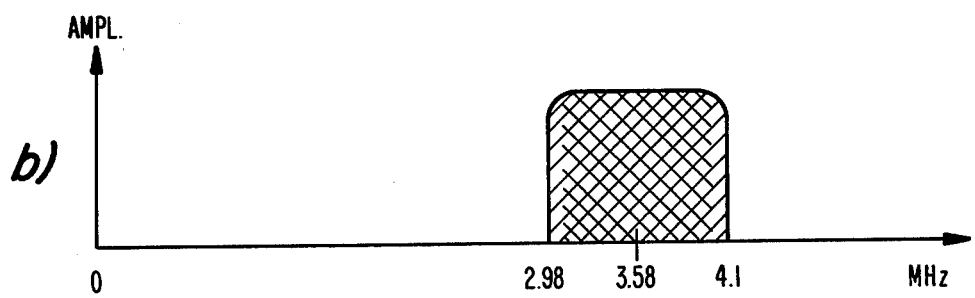

FIGS. 6a and b illustrates in block diagram form a bandpass filter and comb filter arrangement suitable for use in the embodiment of FIG. 5;

FIG. 7 illustrates in block diagram form an interpolator and output bandpass filter suitable for use in the embodiment of FIG. 5;

FIG. 8 illustrates a clock signal generating arrangement suitable for providing necessary clock signals for the arrangements of FIGS. 6 and 7;

FIG. 9 shows clock waveforms used to explain the operation of the clock signal generating arrangement of FIG. 8;

FIGS. 10–12 show the signal contents at various points in the arrangements of FIGS. 6 and 7 during typical operating conditions; and FIG. 13 shows response characteristics of the arrangements of FIGS. 3–7.

Figure 1:
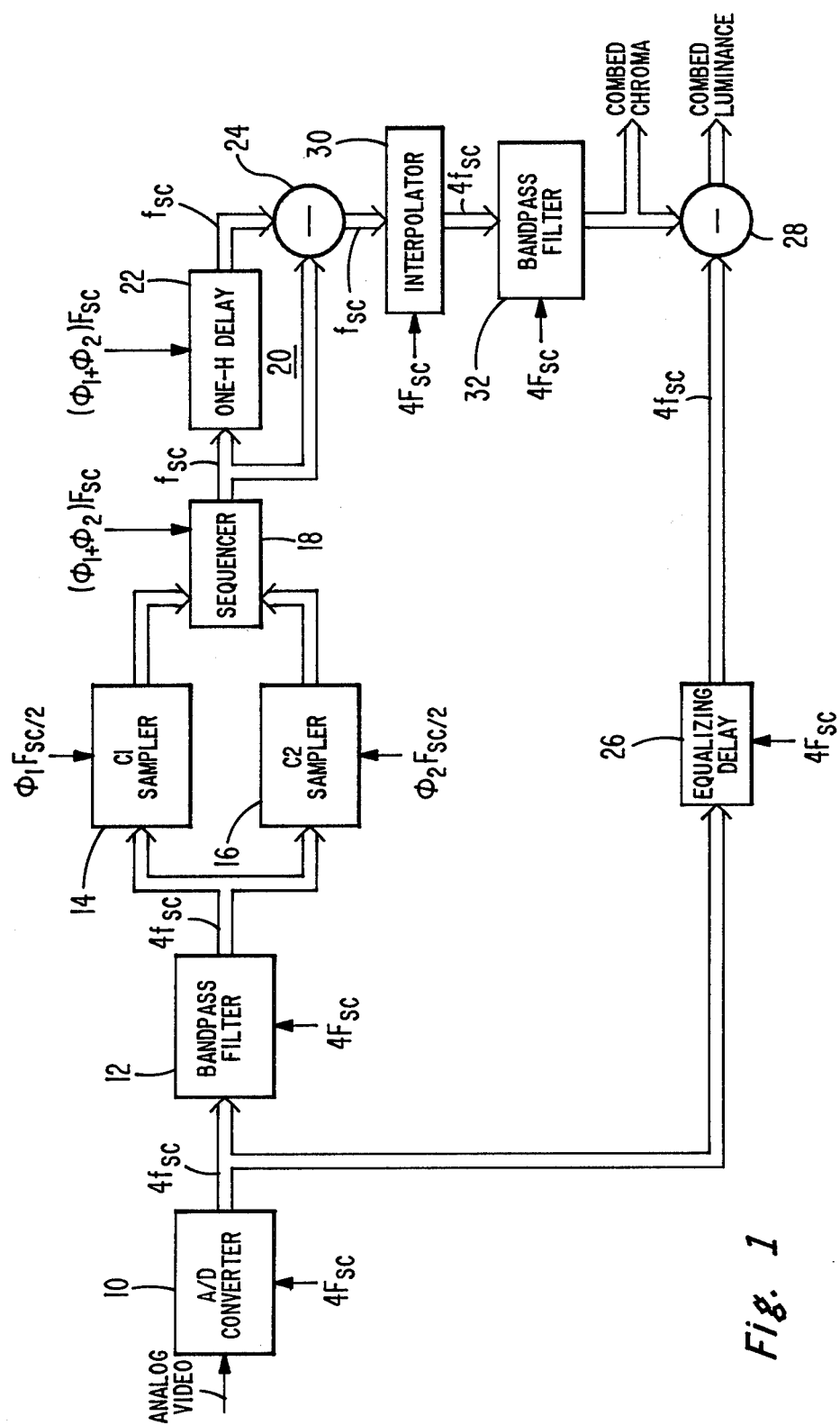
FIG. 1 illustrates in block diagram form a comb filter arrangement constructed in accordance with the principles of the present invention, in which the one-H delay line of the comb filter is clocked at one-quarter the rate of the input video signal sample sequence.

Referring to FIG. 1, a comb filter arrangement constructed in accordance with the principles of the present invention is shown. An analog composite video signal is applied to the input of an analog-to-digital (A/D) converter 10. When the analog signal is an NTSC color signal, it contains interleaved luminance and chrominance components over the band extending from approximately 2.1 to 4.2 MHz. The full signal bandwidth conventionally extends from zero to 4.2 MHz. In FIG. 1, the analog signal is sampled and converted to a sequence of digital words at a $4f_{sc}$ rate by a $4F_{sc}$ sampling signal, where $F_{sc}$ is the color subcarrier frequency. In the NTSC system, the color subcarrier frequency is approximately 3.58 MHz, and $4f_{sc}$ is 14.32 MHz. By sampling and converting the analog signal to digital form at this rate and in a substantially constant phase relationship with the analog color burst signal, an ease in subsequent color demodulation and processing is afforded.

The sampled sequence, at the $4f_{sc}$ rate, is applied to the input of a bandpass filter 12 and to the input of an equalizing delay 26. The bandpass filter 12 is clocked by the $4F_{sc}$ sampling clock signal and exhibits a passband of approximately one MHz for an NTSC signal, extending from about 3.1 MHz to 4.16 MHz. This passband is symmetrically located about the color subcarrier frequency, and includes interleaved luminance and color difference signal [(R-Y) and (B-Y)] information. The output signal sequence of the bandpass filter 12 is at the $4f_{sc}$ sample rate.

The equalizing delay 26 provides a delay for the composite video signal samples which matches the delay encountered by signal samples as they pass from the input of the bandpass filter 12 to the output of a bandpass filter 32.

The filtered signal samples produced by the bandpass filter 12 are subsampled by C1 and C2 samplers 14 and 16. The signal samples are subsampled at an $f_{sc}/2$ rate (1.79 MHz in the NTSC system) in response to two differently phased sampling clocks $\phi_1 F_{sc}/2$ and $\phi_2 F_{sc}/2$. Codewords at an $f_{sc}/2$ rate are produced by the samplers 14 and 16 and are interleaved in a single sequence by a sequencer 18. Codewords are then produced at the output of the sequencer 18 at an $f_{sc}$ rate.

Figure 2:
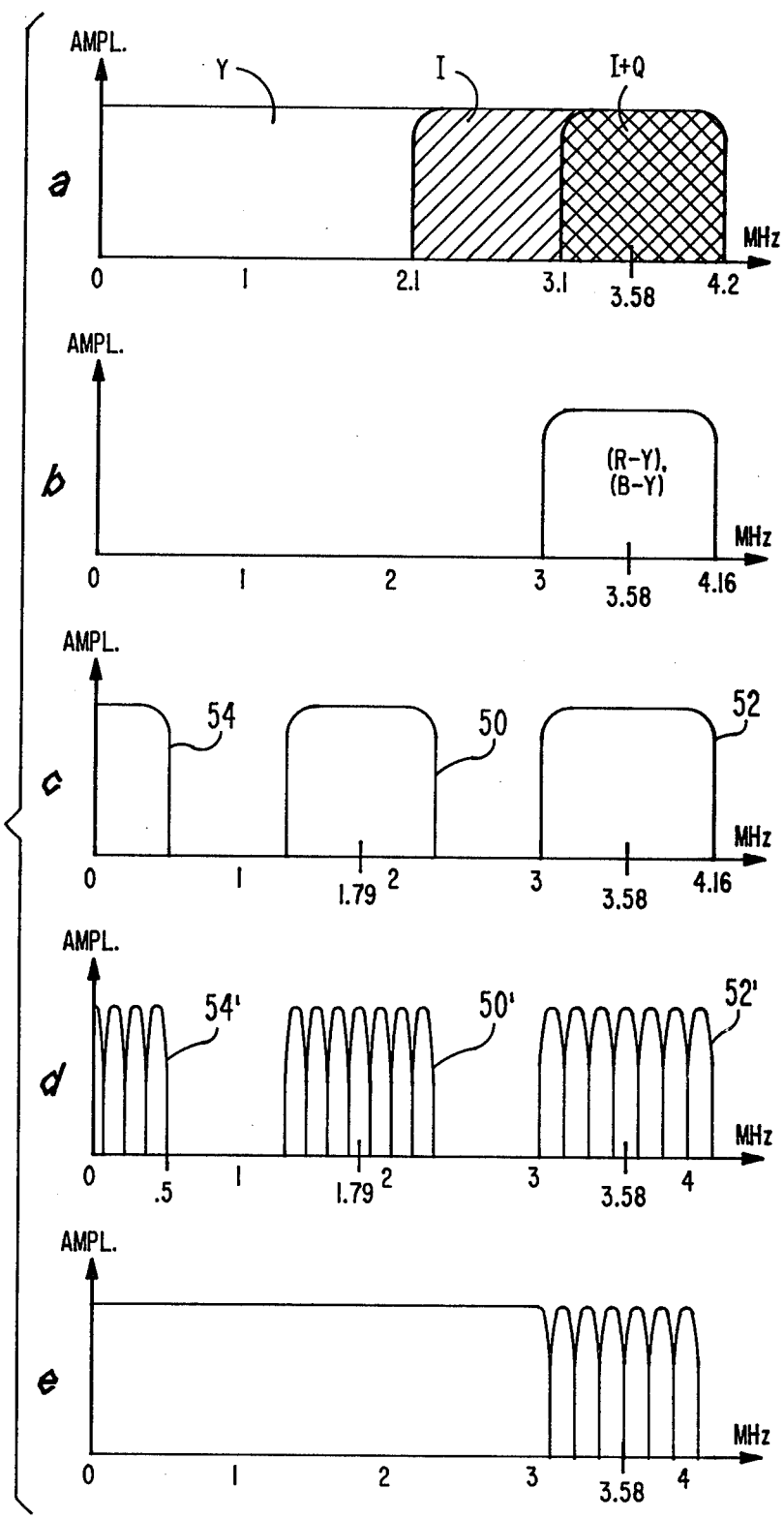
FIG. 2 shows response curves useful for explaining the operation of the embodiment of FIG. 1.

The signal information contained in the original composite video signal is shown in FIG. 2a. The video signal includes luminance (Y) information extending from zero to about 4.2 MHz. I color mixture signal information is interleaved with the luminance information from about 2.1 to 4.2 MHz, and Q color mixture signal information is interleaved over the range from about 3.1 to 4.2 MHz. In the range from 3.1 to 4.2 MHz, the color mixture signal information is modulated as double sideband signals of the color subcarrier at 3.58 MHz. When the composite video signal is filtered by bandpass filter 12, a passband as shown in FIG. 2b results, containing color difference signal information.

By reason of the subsampling of the bandpass filtered signals, replicas of the passband of FIG. 2a are reproduced about multiples of the $f_{sc}$ subsampling frequency and harmonics thereof. FIG. 2c illustrates the replication of passbands resulting from two differently phased 1.79 MHz subsampling signals. A passband 50 is replicated about a frequency of 1.79 MHz, and a passband 52 is replicated about 3.58 MHz. Baseband components are also produced in a passband 54 which extends about 0.58 MHz out from the zero frequency axis.

The signal samples produced by the sequencer 18 are applied to inputs of a one-H delay register 22 and a subtractive combiner 24 of a comb filter 20. The output of the register 22 is coupled to a second input of the subtractive combiner 24. The register 22 is clocked by an $f_{sc}$ rate clock signal $(\phi_1+\phi_2)F_{sc}$, which is a combination of the two subsampling clock signals. Since the register 22 is clocked at the $f_{sc}$ rate, it requires approximately 227 stages for an NTSC signal. For an eight-bit signal, only 1816 storage locations are necessary for the one-H delay line. The comb filter combs the signals of the replicated passbands, and exhibits an output spectral response as shown in FIG. 2d. The signal at the output of the subtractive combiner 24 may be lowpass filtered to eliminate all but the baseband comb filtered components in passband 54', which comprise demodulated color mixture signal components. These baseband components are then available for further color signal processing.

The output of the subtractive combiner 24 is coupled to the input of an interpolator 30, which interpolates intermediate signal values to produce a $4f_{sc}$ rate sample sequence. This sample sequence is filtered by a bandpass filter 32, which produces only information in passband 52' of FIG. 2d at its output. The interpolator and bandpass filter may be combined in a single interpolating bandpass filter, using a technique to be described in conjunction with FIG. 7 of the present application. Combed chrominance signals in the 3 to 4.16 MHz passband 52' are produced at the output of the bandpass filter 32 in a $4f_{sc}$ rate sample sequence.

The combed chrominance signals are then subtractively combined with the input composite video signal samples by a subtractive combiner 28. The composite video signal samples are applied to the combiner 28 by an equalizing delay 26 to bring samples of the composite signal into time sequence with corresponding combed chrominance signal samples. The resultant comb filtered luminance signal produced at the output of subtractive combiner 18 is illustratively shown in FIG. 2e, and is seen to be comb filtered over the one MHz color difference signal band.

Several principles of operation are inherent in the foregoing embodiment of the present invention. The A/D converter clock rate must satisfy the Nyquist criterion for the video signal bandwidth. For instance, if the video signal bandwidth is 4 MHz, the A/D converter clock rate must be at least 8 MHz. The C1 and C2 samplers must be clocked at a frequency which is at least equal to the bandwidth of the bandpass filter. If the passband of the bandpass filter is one MHz, for example, the samplers must each be clocked at a rate of at least one MHz. In addition, the sampler clocks must be at different phases of the sampler clock frequency for clock frequencies less than two MHz in this example. Any two different phases are satisfactory, except a 180° phase relationship, which can only be used if the low frequency cutoff of the bandpass filter 12 passband is integrally related to the sampler clock frequency and to the passband. This means that if the bandpass filter passband extends from 2 MHz to 4 MHz, and the sampler clock frequency is 2 MHz, for instance, the sampler clocks may exhibit a 180° phase relationship. When this restriction is violated, undesirable harmonic components are created in the signal passbands. Finally, a bandpass filter 32 must follow the comb filter so that low frequency signal components, such as those contained in passbands 54' and 50' of FIG. 2d, are not combined with the composite signal when the comb filter luminance signal is produced.

Figure 3:
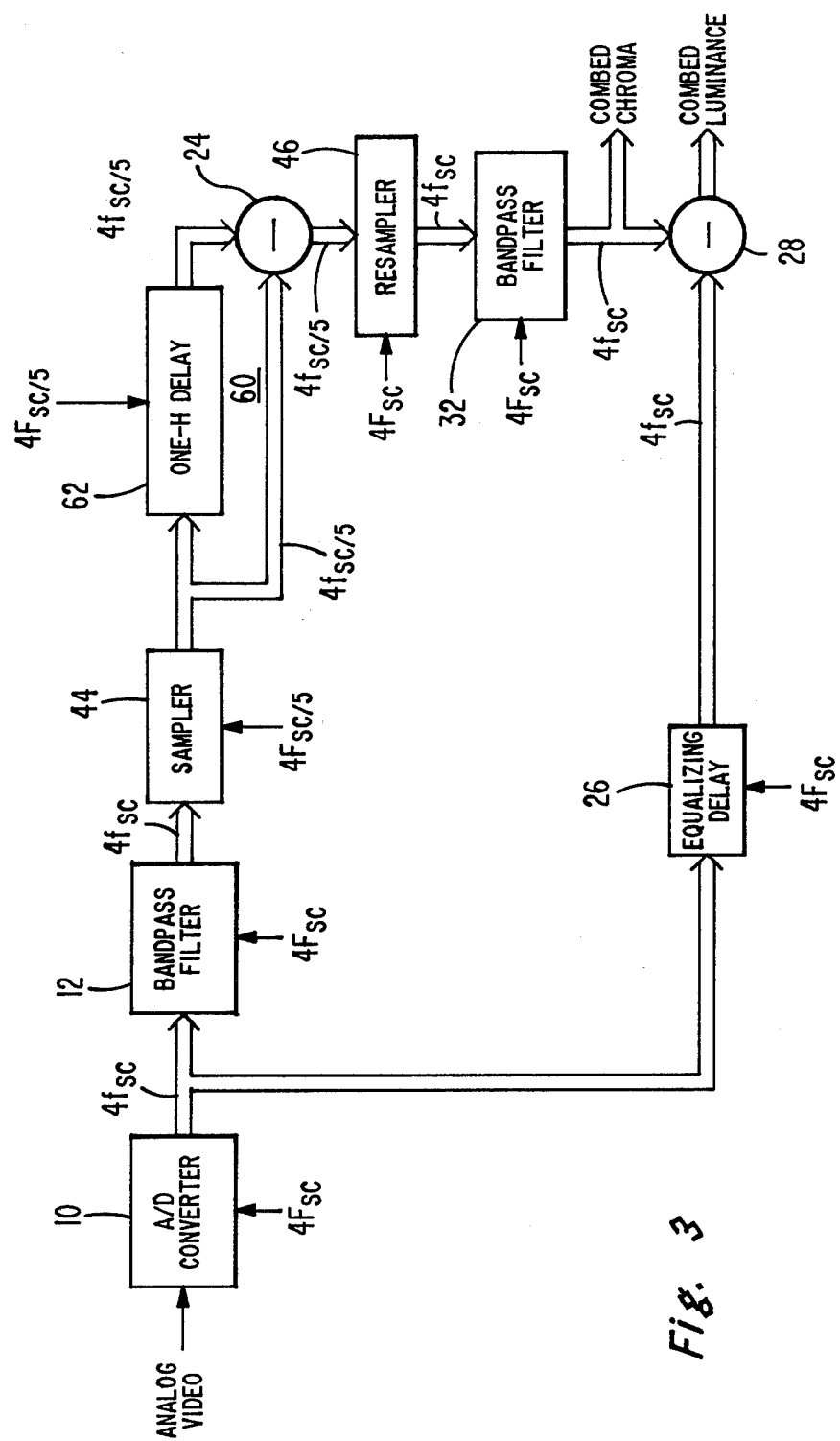
FIG. 3 illustrates in block diagram form a second comb filter arrangement constructed in accordance with the principles of the present invention, in which the one-H delay line of the comb filter is clocked at one-fifth the rate of the input video signal sample sequence.

In FIG. 3, a second comb filter arrangement, constructed in accordance with the principles of the present invention, is shown. Elements in FIG. 3 which function substantially in the same manner as corresponding elements in FIG. 1 bear the same reference numerals and will not be further described.

In FIG. 3, the $4f_{sc}$ filtered sample sequence at the output of the bandpass filter 12 is subsampled at a $4f_{sc}/5$ rate by a sampler 44. In the NTSC system, the $4f_{sc}/5$ subsampling clock frequency is approximately 2.86 MHz. Signal samples at this rate are applied to inputs of a one-H delay register 62 and the subtractive combiner 24 of a comb filter 60. The one-H delay register 62 delays the applied signal samples by the time interval of one horizontal television line and applies delayed signal samples to a second input of the subtractive combiner 24. For an NTSC signal, the subtractive combiner 24 will produce comb filtered chrominance signal samples at the $4f_{sc}/5$ rate. The one-H delay register 62 is clocked by the $4F_{sc}/5$ clock signal. Therefore, 182 delay stages are required to delay NTSC signal samples by the time of one horizontal line interval. For eight bit samples, this means that 1456 storage locations are needed for the delay register 62, compared with the 1816 storage locations required by delay register 22 of FIG. 1 for eight bit samples. Moreover, a horizontal line of signal samples comprises 910 samples for a $4f_{sc}$ sampled NTSC signal. When this sequence is subsampled at an $f_{sc}/2$ rate by the C1 and C2 samplers in FIG. 1, 227½ samples are taken during every line. The extra half sample must be taken into consideration when designing the comb filter and its clock circuitry, necessitating a reversal of the phases of the subsampling clocks from line to line as described in the aforementioned U.S. patent application (Ser. No. 78,334). This requires relatively complex clock circuitry, as shown in that patent application. However, in the arrangement of FIG. 3, exactly 182 samples are selected by the sampler 44 each horizontal line, and the subsampling and comb filter clocks therefore require no phase reversal from line to line. The clock signal circuitry required by the arrangement of FIG. 3 is thus less complex than that required by the arrangement of FIG. 1.

The $4f_{sc}/5$ rate combed chrominance signal samples produced by combiner 24 are applied to a resampler 46, which functions in the manner of the interpolator 30 of FIG. 1 to fill in intermediate samples so as to produce a $4f_{sc}$ rate sample sequence. This sample sequence is then bandpass filtered by filter 32 to produce comb filtered chrominance samples in the chroma passband. The comb filtered chrominance samples are then subtractively combined with the composite video signal samples to produce the comb filtered luminance signal.

Figure 4:
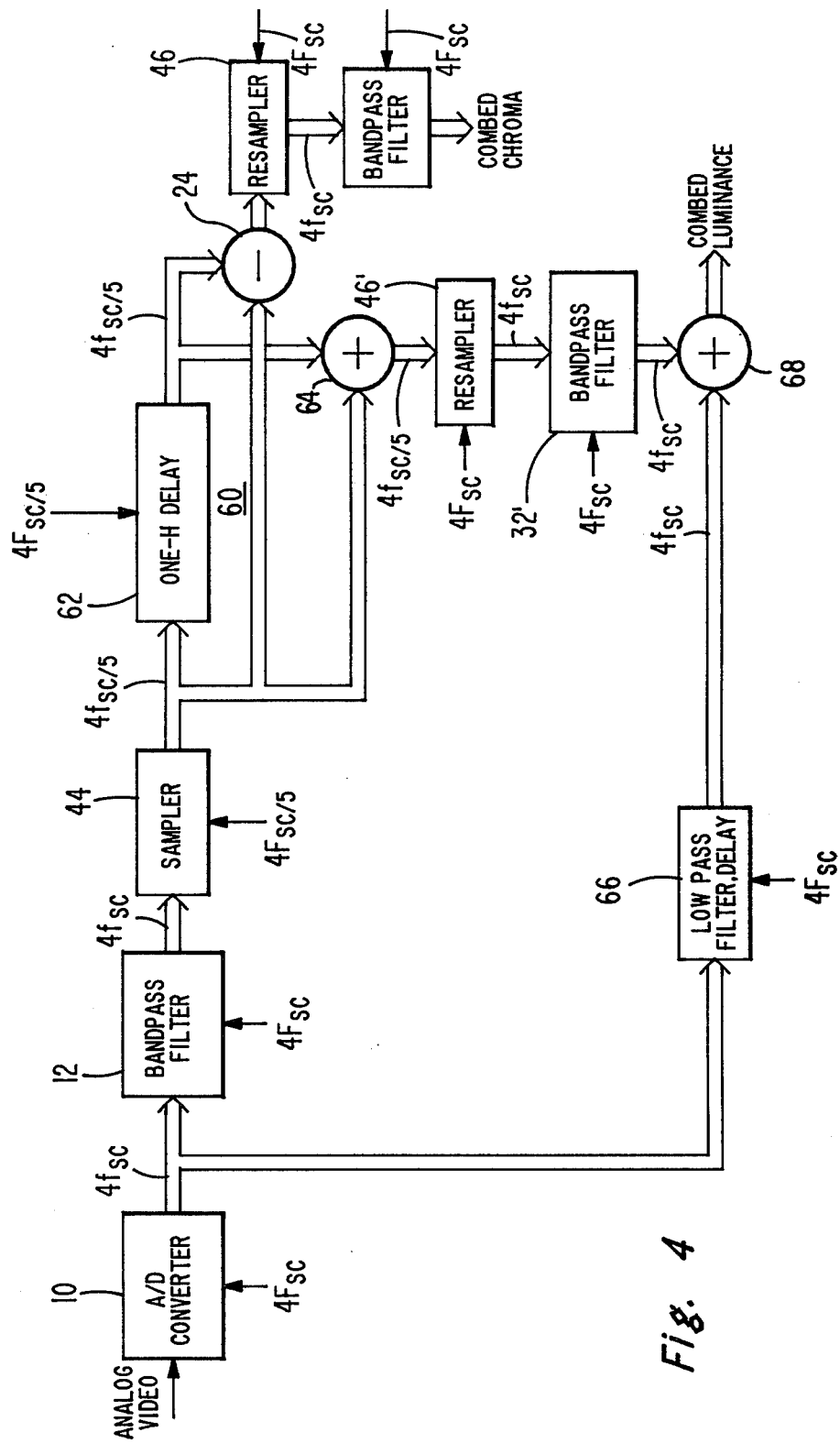
FIG. 4 illustrates in block diagram form a third comb filter arrangement constructed in accordance with the principles of the present invention in which the one-H delay line is used to comb filter two interleaved signal sequences at a reduced data rate.

The comb filter arrangement of FIG. 4 is similar to that of FIG. 3, except that the comb filter 60 includes two signal combiners which produce comb filtered chrominance signal samples and comb filtered luminance signal samples. The $4f_{sc}/5$ rate samples at the output of the sampler 44 are applied to inputs of the one-H delay register 62, the subtractive combiner 24, and an additive combiner 64. The output of the delay register 62 is coupled to the second inputs of combiners 24 and 64. Comb filtered chrominance signal samples are produced at the output of the subtractive combiner 24 at a $4f_{sc}/5$ rate. This sample sequence is increased to a $4f_{sc}$ rate by resampler 46, and is then filtered by bandpass filter 32. Comb filtered chrominance signal samples at the $4f_{sc}$ sample rate are produced at the output of the bandpass filter 32.

The additive combiner 64 combines delayed and undelayed samples to produce comb filtered luminance signal samples at a $4f_{sc}/5$ rate. This sample sequence is interpolated up to a $4f_{sc}$ rate by a second resampler 46'. The interpolated sequence is then filtered by a bandpass filter 32', which produces comb filter luminance signals over the same passband as that of the input bandpass filter 12. These high frequency, comb filtered luminance signal samples are then additively combined with complementary lowpass filtered and delayed composite video signal samples to produce a reconstituted luminance signal which is comb filtered over the passband formerly occupied by the color difference signals. Additive combining circuit 68 will therefore exhibit an output response characteristic substantially as that shown in FIG. 2e, with that portion of the response characteristic between zero and 3 MHz being provided by a lowpass filter 66, and that portion between 3 MHz and 4 MHz being contributed by the bandpass filter 32'.

The comb filter arrangement of FIG. 5 is functionally similar to that of FIG. 3. In FIG. 5, the sampler 44 of FIG. 3 is divided into two samplers 44a and 44b, which subsample the applied $4f_{sc}$ rate sequence at respectively different phases $\phi_1$ and $\phi_2$ of a $4f_{sc}/10$ rate subsampling signal. The differently phased subsampled sequences are applied to respective one-H delay registers 62a and 62b, and to inputs of respective subtractive combiners 24a and 24b. The outputs of the delay register are coupled to second inputs of the respective subtractive combiners. The combiners 24a and 24b produce comb filtered chrominance signal sample sequences at a $4f_{sc}/10$ rate. These two sequences are resampled by resampler 46 and interpolated up to the original $4f_{sc}$ sample rate. The $4f_{sc}$ rate sample sequence is filtered by bandpass filter 32 and subtractively combined with composite video signal samples to produce the comb filtered luminance signal sequence.

The arrangement of FIG. 5 is shown in greater detail in the embodiment of FIGS. 6 and 7. In FIGS. 6 and 7, thin lines represent clock signal lines and heavy lines represent multibit data paths. In FIG. 6, composite video signal samples at a $4f_{sc}$ rate (14.32 MHz in the NTSC system) are applied to the input of bandpass filter 12, which comprises a 31-stage output tap-weighted FIR filter.

The FIR filter includes a thirty stage shift register 70 with stages labelled $\tau_1$-$\tau_{30}$, thirty-one coefficient weighting circuits 72 coupled to output taps of the shift register 70, and an adder tree 80 for combining the tap-weighted signals produced by the coefficient weighting circuits. Composite video signal samples are clocked through the shift register 70 by a $4F_{sc}$ clock signal. Filtered output signals are produced at the output of the final adder tree adder 81, which exhibits a passband extending from approximately 2.98 MHz to 4.18 MHz. The filtered output sequence is at the $4f_{sc}$ sample rate.

The sample sequence at the output of adder 81 is subsampled by phased clock signals $F_{\phi 2/10}$ and $F_{\phi 3/10}$, which load signal samples into latched $L_{\phi 1}$ and $L_{\phi 2}$. The latches $L_{\phi 1}$ and $L_{\phi 2}$ thus provide differently phased subsampled sequences at a $4f_{sc}/10$ rate. The output of latch $L_{\phi 1}$ is coupled to the input of a ninety-one stage shift register 62a and to the input of an adder 92. The output of the last stage $\tau_{91}$ of shift register 62a is coupled to the input of an inverting circuit 90, which inverts, or one's complements, all of the bits of the signal samples provided by shift register 62a. The one's complemented samples of the inverting circuit are applied to a second input of adder 92 which, together with a "carry-in" bit CI, set to one, accomplishes a two's complementing of the delayed signal samples for proper subtraction from the undelayed samples. The adder 92 thus produced comb filtered chrominance signal samples at a $4f_{sc}/10$ rate. These samples are loaded into a comb filter output latch $L_{\phi 1CF}$ in response to a $4f_{sc}/10$ rate clock signal, $F_{\phi 3/10}$. Latch $L_{\phi 1CF}$ produces a comb filtered chrominance signal sequence $C_{\phi 1}$ at one phase of the subsampling signal.

The output of latch $L_{\phi 2}$ is similarly coupled to the input of a second comb filter shift register delay line 62b, also ninety-one stages in length. The output of latch $L_{\phi 2}$ is also coupled to an input of an adder 96. The delayed samples at the output of shift register 62b are one's complemented by an inverting circuit 94 and applied to a second input of adder 96 which, together with carry-in bit CI, subtractively combines the delayed and undelayed signal samples. Comb filtered signal samples at the output of adder 96 are loaded into a second comb filter output latch $L_{\phi 2CF}$, by a clock signal $F_{\phi 4/10}$, which produces a $4f_{sc}/10$ rate comb filtered chrominance sample sequence $C_{\phi 2}$ at a second phase of the subsampling signal.

The comb filtered sequences $C_{\phi 1}$ and $C_{\phi 2}$ produced by latches $L_{\phi 1CF}$ and $L_{\phi 2CF}$ are applied to inputs of AND gates 102 and 104 of resampler 46 in FIG. 7. When clock signal $F_{\phi 3/10}$ is high, a sample of the $C_{\phi 1}$ sample sequence is coupled through AND gate 102 to appear at the output of OR gate 106. When the differently phase clock signal $F_{\phi 4/10}$ is high, a $C_{\phi 2}$ sample is gated through AND gate 104 and OR gate 106. At all other times zero value signals are produced at the output of OR gate 106.

The signal sequence at the output of OR gate 106, comprising zero value signals interposed among $C_{\phi 1}$ and $C_{\phi 2}$ samples, is clocked into a shift register 170 of bandpass filter 32 by a $4f_{sc}$ rate clock, $\overline{4F_{sc}}$. The bandpass filter 32 exhibits the same response characteristic as bandpass filter 12, and is constructed in a similar manner. The bandpass filter 32 includes a thirty stage shift register 170, thirty-one coefficient weighting circuits 172 coupled to output taps of the shift register, and an adder tree 180 which combines the tap-weighted signals at the output of a final adder 181. Since bandpass filter 32 is constructed in the same manner as bandpass filter 12, only a portion of its elements are shown in FIG. 7 for ease of illustration.

The final adder 181 produces a comb filtered chrominance signal sample sequence in the chroma passband defined by the filter characteristic. This sample sequence is latched into a chrominance latch $L_C$ by the $4F_{sc}$ clock signal, from which it is available for subsequent color signal demodulation and processing. The comb filtered chrominance signal is one's complemented by an inverting circuit 110 and applied to an adder 112 along with a carry-in bit CI, which performs a two's complementing of the comb filtered chrominance signal for subtraction. The adder 112 also receives the composite video signal sample sequence by way of a delay equalizing shift register 26. The comb filtered chrominance signal is subtractively combined with the composite video signal to produce a comb filtered luminance signal sequence at the output of adder 112.

Circuitry for providing the clock signals for the comb filter system of FIGS. 6 and 7 is shown in FIG. 8. The color burst signal of the composite analog video signal is gated by a burst gate 120 to a first phase-locked loop 122. The phase-locked loop 122 produces an oscillatory waveform $F_{sc}$ in phase and frequency synchronism with the color subcarrier signal represented by the color burst signal. A representative $F_{sc}$ signal is shown in FIG. 9a. The $F_{sc}$ clock signal is applied to an input of a phase detector 132 of a second phase-locked loop 130. The phase detector 132 produces a control signal for an oscillator 134, which produces an oscillatory signal $4F_{sc}$ at four times the color subcarrier frequency and in a substantially constant phase relationship therewith. A $4F_{sc}$ signal is shown in FIG. 9b. A complementary clock signal $\overline{4F_{sc}}$ is produced at the output of an inverter 138 in response to the $4F_{sc}$ clock signal. The $4F_{sc}$ signal is divided down by a divide-by-four circuit 136, the output of which is coupled to the second input of the phase detector 132.

The $4F_{sc}$ clock signal is applied to the input of a divide-by-ten circuit or decade counter 140, which produces an output pulse $F_{\phi 1/10}$ during every tenth cycle of the $4F_{sc}$ clock signal, as shown in FIG. 9c. The $F_{\phi 1/10}$ pulse sequence is applied to the data input of a D type flip-flop 142, which produces a delayed clock signal $F_{\phi 2/10}$ at its Q output as shown in FIG. 9d. The $F_{\phi 2/10}$ clock signal is applied to the data input of a second D type flip-flop 144, which produces a further delayed pulse sequence $F_{\phi 3/10}$ at its Q output as shown in FIG. 9e. The $F_{\phi 3/10}$ clock signal is applied to the data input of a third D type flip-flop 146, which produces a further delayed clock signal $F_{\phi 4/10}$ at its Q output, as shown in FIG. 9f. Flip-flops 142, 144, and 146, like the divide-by-ten circuit 140, are clocked in synchronism by the $4F_{sc}$ clock signal.

The operation of the comb filter system of FIGS. 6 and 7 and the clock signal circuitry of FIG. 8 is explained by referrring concurrently to the timing diagrams of FIGS. 10, 11, and 12. These timing diagrams are drawn to the same time scale as the clock signal waveforms of FIG. 9.

FIG. 10a shows a portion of the composite video signal sample sequence at the input to the first stage $\tau_1$ of the shift register 70 of bandpass filter 12. Since video signal is sampled at four different phases relative to the color subcarrier signal $F_{sc}$, the samples in FIG. 10a are denoted $\phi_1$, $\phi_2$, $\phi_3$, $\phi_4$, etc. When the video signal is an NTSC signal, a horizontal line will comprise 910 samples at the $4f_{sc}$ sample rate. The last ten samples 901–910 of one line are representatively shown in FIG. 10a, and are followed by the first sixteen samples 1–16 of the succeeding horizontal television line.

Filtered signal samples are produced at the output of the FIR bandpass filter 12 of FIG. 6 following the characteristic delay time of the filter. The delay time is the time required for a given sample to be clocked to the impulse response center of the filter at the output of shift register stage $\tau_{15}$, and then to propagate through the coefficient weighting circuits 72 and the adder tree 80 to the output of the final adder 81. For purposes of illustration, it will be assumed that the coefficient weighting circuits each exhibit a propagation delay time of 66 nanoseconds, and that each adder in the adder tree 80 exhibits a propagation delay time of 40 nanoseconds. It may be seen that a signal at the output of each coefficient weighting circuit encounters five adder delays before it arrives at the output of the final adder 81. A delay $\tau_{1A}$ equal to the propagation delay of one adder is coupled in the signal path at the output of shift register stage $\tau_{12}$ to equalize the propagation delay of that signal path to the delays of all other paths. Without the $\tau_{1A}$ delay, this signal path would exhibit only four adder delays. Therefore, the propagation delay between each shift register tap and the output of adder 81 is the sum of 66 nanoseconds for the coefficient weighting circuit, plus five times 40 nanoseconds, or a total of 266 nanoseconds. The total delay of the bandpass filter 12 is then fifteen cycles of the $4F_{sc}$ shift register clock, plus 266 nanoseconds, or approximately 18.8 cycles of the $4F_{sc}$ clock in an NTSC system. In FIG. 10b, it is seen that a sample $\phi_{1F}$ corresponding to $\phi_1$ sample 901 of FIG. 10a is produced at the output of adder 81 following a delay of 18.8 samples. Sample 901 of FIG. 10b is seen to appear during the end of the time that sample 9 is applied to the input of the bandpass filter 12. A sequence of filtered samples as shown in FIG. 10b is produced at the output of the final adder 81 in the illustrated time correspondence with the input sequence of FIG. 10a.

The filtered sample sequence at the output of adder 81 is loaded into subsampling latches $L_{\phi 1}$ and $L_{\phi 2}$ by the $F_{\phi 2/10}$ and $F_{\phi 3/10}$ clock signals, respectively. The $F_{\phi 2/10}$ clock signal, shown in FIG. 10c, loads the $\phi_{IF}$ sample 901 into the $L_{\phi 1}$ latch, the contents of which are shown in FIG. 10d. Similarly, the $F_{\phi 3/10}$ clock signal shown in FIG. 10e loads the $\phi_{2F}$ sample 902 into the $L_{\phi 2}$ latch as shown in FIG. 10f. FIGS. 10d and 10f, which represent the subsampling latch contents, are reproduced in FIGS. 11b and 11d. The input sample sequence of FIG. 10a is reproduced and continues as shown in FIG. 11a.

The samples held in the $L_{\phi 1}$ and $L_{\phi 2}$ latches are subtractively combined with samples taken one horizontal line earlier in adders 92 and 96. When adders 92 and 96 exhibit the same 40 nanosecond propagation delay as the previous adders, comb filtered samples appear at the output of the adders following this delay time as shown in FIGS. 11c and 11e. The comb filtered sample $\phi_{1CF}$—901 at the output of adder 92 (FIG. 11c) is loaded into latch $L_{\phi 1CF}$ by the $F_{\phi 3/10}$ clock signal of FIG. 11f, as shown by the $L_{\phi 1CF}$ latch contents of FIG. 11g. Similarly, the comb filtered sample $\phi_{2CF}$—902 at the output of adder 96 (FIG. 11e) is loaded into latch $L_{\phi 2CF}$ by the $F_{\phi 4/10}$ clock signal of FIG. 11h, as shown by the latch $L_{\phi 2CF}$ contents of FIG. 11i. Thus, FIG. 11g represents the sequence of samples of the $C_{\phi 1}$ signal, and FIG. 11i represents the sequence of samples of the $C_{\phi 2}$ signal.

The $C_{\phi 1}$ and $C_{\phi 2}$ signals are gated through the resampler 46 of FIG. 7 by the $F_{\phi 3/10}$ and $F_{\phi 4/10}$ clock signals. During the duration of each pulse of the $F_{\phi 3/10}$ clock signal of FIG. 11f, the latched $C_{\phi 1}$ signal of FIG. 11g appears at the output of OR gate 106. At the midpoint of the $F_{\phi 3/10}$ pulse, the positive-going edge of the $\overline{4F_{sc}}$ clock of FIG. 11j loads the $C_{\phi 1}$ sample into stage $\tau_1$ of the shift register 170 of bandpass filter 32. The signal sequence at the output of stage $\tau_1$ of shift register 170 is shown in FIG. 11k. Similarly, during the occurrence of an $F_{\phi 4/10}$ pulse of FIG. 11h, the $C_{\phi 2}$ sample shown in FIG. 11i is produced at the output of OR gate 106 and is loaded into stage $\tau_1$ during the next rising edge of the $\overline{4F_{sc}}$ clock signal. When pulses of the $F_{\phi 3/10}$ and $F_{\phi 4/10}$ clocks are not present, the $\overline{4F_{sc}}$ clock signal loads zero values into the shift register 170. Thus, the shift register 170 receives two comb filtered samples, such as $\phi_{1CF}$—901 and $\phi_{2CF}$—902, followed by eight zero value signal samples, as shown in FIG. 11k.

When the bandpass filter shift register 170 is loaded with the sample sequence of FIG. 11k, the filter will weight and combine the samples in the register so as to produce a $4f_{sc}$ rate sequence with interpolated values filling in the zero value samples. The bandpass filter 32 thus not only filters the sample sequence, but also performs an interpolation function. Since bandpass filter 32 is constructed in the same manner as bandpass filter 12 of FIG. 6, it exhibits the same filter delay of 18.8 cycles of the $4F_{sc}$ clock. Filtered samples will appear at the output of the final adder 181 as shown in FIG. 11m, in time correspondence with the $\tau_1$ stage sample sequence of FIG. 11k. The filtered sample sequence of FIG. 11m is latched into the $L_C$ latch by the $4F_{sc}$ clock signal to produce the output sequence shown in FIG. 11n. The comb filtered chrominance sample sequence of FIG. 11n is redrawn in FIG. 12b, in time correspondence with the original composite signal sample sequence of FIG. 11a, which is redrawn in FIG. 12a.

By comparing the sample sequences of FIGS. 12a and 12b, it may be seen that the chrominance sample sequence of FIG. 12b is delayed by thirty-nine samples relative to the input sequence of FIG. 12a. In order to bring the two sequences into time correspondence, the input sequence of FIG. 12a must be delayed by thirty-nine cycles of the $4F_{sc}$ clock. This is accomplished by taking the composite video signal sample sequence at the output of stage $\tau_{30}$ of bandpass filter shift register 70 of FIG. 6 and delaying this sequence by an additional nine $4F_{sc}$ clock cycles in shift register 26 of FIG. 7. This will bring the composite video signal samples into time correspondence with samples of the comb filtered chrominance signal at the inputs to adder 112. The adder 112 will produce a comb filtered luminance signal sample sequence as shown in FIG. 12c (which does not take the propagation delay of adder 112 into consideration).

An advantage of the arrangement of FIGS. 6 and 7 resides in the low number of stages required for the comb filter shift registers 62a and 62b. Each shift register is only ninety-one stages long, and is clocked by a $4f_{sc}/10$ rate clock signal. For instance, in the NTSC system, the $4F_{sc}$ clock has a frequency of approximately 14.32 MHz. The comb filter shift registers are then each clocked at a 1.432 MHz rate. The comb filter clocks have a cycle time of approximately 0.698 microseconds which, when multiplied by ninety-one, results in a 63.55 microsecond delay, the time interval of one horizontal line in the NTSC system. By reason of the restricted bandwidth of the bandpass filter 12, samples at the rate of two every 0.698 microseconds by latches $L_{\phi 1}$ and $L_{\phi 2}$ are sufficient to comb filter the signal at the low clock frequency, then to recreate the original $4f_{sc}$ rate sequence through interpolation in the interpolating bandpass filter 32. Finally, by taking two samples of every ten of the 910 sample line sequence, no phase reversal of the sampling clocks is necessary from line to line, which is required in the embodiments of FIG. 1 and the aforementioned U.S. patent application Ser. No.

405,165 filed Aug. 4, 1982 to align in time vertically aligned samples from one line to another.

The comb filter arrangements of FIGS. 3-7 of the present invention exhibit response characteristics as depicted in FIG. 13. As discussed above, the composite video signal in the NTSC system includes luminance information over a range of zero to approximately 4.2 MHz, with I color mixture signal information interleaved over the range of about 2.1 to 4.2 MHz and Q color mixture signal information interleaved in the range of about 3.1 to 4.1 MHz. The I and Q signals are double sideband modulated signals of the 3.58 color subcarrier in the range of 3.1 to 4.1 MHz, as shown in FIG. 13a.

When the composite video signal of FIG. 13a is applied to the bandpass filter 12, only the band from about 2.98 MHz to 4.18 MHz is passed, as shown in FIG. 13b. The subsampling of the bandpass filtered signal by the $4F_{sc}/5$ clock of FIGS. 3 and 4, or the two $4F_{sc}/10$ clocks of FIGS. 5 and 6, causes a replication of spectra about the subsampling frequency (2.864 MHz or 1.432 MHz, respectively) and harmonics thereof, as shown in FIG. 13c. The comb filtering process effectively comb filters all of the spectra simultaneously. The spectral repeats of FIG. 13c must be bandpass filtered after comb filtering and interpolation so that only the original spectrum between 2.98 MHz and 4.18 MHz is left to be subtractively combined with the composite signal to comb filter the luminance signal over the 2.98 MHz to 4.18 MHz passband.

What is claimed is:

1. In a television receiver, including a source of analog video signals occupying a given passband and including first and second frequency interleaved signal components, one of which is modulated as double sideband signals of a subcarrier frequency, a signal separation system comprising:
   an analog to digital converter having an input responsive to said analog video signals and an output at which digitized video signal samples are produced in response to a sampling signal;
   a first bandpass filter having an input responsive to said digitized video signal samples for producing filtered signal samples occupying at least that portion of said given passband over which said one interleaved signal component is modulated as a double sideband signal;
   a comb filter, including a shift register and a signal combining circuit having inputs coupled to receive selected ones of said filtered signal samples in response to a subsampling clock signal having a frequency which is not greater than said subcarrier frequency, an output of said shift register being coupled to a second input of said signal combining circuit so as to produce comb filtered signal samples at said subsampling clock signal frequency, said comb filtered signal samples corresponding to one of said frequency interleaved signal components.

2. The arrangement of claim 1, further comprising:
   a second bandpass filter having an input coupled to receive said comb filtered signal samples, and an output at which replicas of said comb filtered signal samples are produced at the frequency of said sampling signal and occupying that portion of said given passband over which said one interleaved signal component is modulated as a double sideband signal; and
   means for combining said comb filtered signal sample replicas with said digitized video signal samples to produce a second comb filtered signal corresponding to the other of said interleaved signal components.

3. In a television signal processing system, including a source of sampled data video signals occupying a video passband and at a given data rate which is at least twice the difference between the highest and lowest frequencies of said passband, said video signals including first and second frequency interleaved signal components, one of which is modulated as double sideband signals of a subcarrier frequency; a comb filter system comprising:
   a first bandpass filter having an input responsive to said sampled data video signals and an output at which filtered signal samples are produced occupying that portion of said video passband over which said one interleaved signal component is modulated as a double sideband signal;
   a comb filter, including a shift register and a signal combining circuit having inputs coupled to receive selected ones of said filtered signal samples in response to a subsampling clock signal having a frequency which is at least twice the bandwidth of said passband of said first bandpass filter and is less than said subcarrier frequency, an output of said shift register being coupled to a second input of said signal combining circuit to apply delayed filtered signal samples thereto, so as to produce at an output comb filtered signal samples at said subsampling clock signal frequency which correspond to one of said frequency interleaved signal components; and
   a second bandpass filter having an input coupled to receive said comb filtered signal samples, and an output at which replicas of said comb filtered signal samples are produced which occupy that portion of said given passband over which said one interleaved signal component is modulated as a double sideband signal.

4. The arrangement of claim 3, wherein said replicas of said comb filtered signal samples are produced at the frequency of said sampling signal; and further comprising:
   means for combining said comb filtered signal sample replicas with said digitized video signal samples to produce a second comb filtered signal corresponding to the other of said interleaved signal components.

5. The arrangement of claim 3, wherein said signal combining circuit comprises a subtractive signal combining circuit, and said comb filtered signal samples comprise a comb filtered chrominance signal.

6. The arrangement of claim 4, wherein said signal combining circuit comprises an additive signal combining circuit, said comb filtered signal samples comprise comb filtered luminance samples and said replicas of said comb filtered signal samples are produced at the frequency of said sampling signal; and further comprising:
   a lowpass filter having an input coupled to said source of sampled data video signals and an output for passing video signal samples occupying a passband which is complementary to that of said second bandpass filter; and
   means for combining said comb filtered signal sample replicas produced by said second bandpass filter with said video signal samples passed by said lowpass filter to produce a comb filtered luminance signal occupying said video passband.

7. In a television signal processing system, including a source of sampled data video signals occupying a video passband and at a given data rate which is at least twice the difference between the highest and lowest frequencies of said passband, said video signals including first and second frequency interleaved signal components, one of which is modulated as double sideband signals of a subcarrier frequency; a comb filter system comprising:

a first bandpass filter having an input responsive to said sampled data video signals and an output at which filtered signal samples are produced occupying that portion of said video passband over which said one interleaved signal component is modulated as a double sideband signal;

a first comb filter, including a shift register and a signal combining circuit having inputs coupled to receive selected ones or said filtered signal samples in response to a first subsampling clock signal having a frequency which is less than twice the bandwidth of said passband of said first bandpass filter, an output of said shift register being coupled to a second input of said signal combining circuit to apply delayed filtered signal samples thereto so as to produce filtered signal samples thereto so as to produce first comb filtered signal samples at said first subsampling clock signal frequency;

a second comb filter, including a second shift register and a second signal combining circuit having inputs coupled to receive selected ones of said filtered signal samples in response to a second subsampling clock signal having a frequency which is less than twice the bandwidth of said passband of said first bandpass filter and of a different phase relative to said first subsampling clock signal, an output of said second shift register being coupled to a second input of said second signal combining circuit to apply delayed filtered signal samples thereto so as to produce second comb filtered signal samples at said second subsampling clock signal frequency; and a second bandpass filter having an input responsive to said first and second comb filtered signal samples and an output at which bandpass filtered comb filtered signals are produced which occupy a passband which is substantially of the same frequency width as the passband of said first bandpass filter, said bandpass filtered comb filtered signals corresponding to one of said interleaved signal components of said sampled data video signals.

8. The arrangement of claim 7, wherein one of said interleaved signal components comprises chrominance information signals, said signal combining circuts comprise subtractive signal combining circuits, said bandpass filtered comb filtered signals contain said chrominance information, the frequency of said first subsampling clock signal is equal to the frequency of said second subsampling clock signal, and the passband of said first bandpass filter is substantially equal to that of said second bandpass filter.

9. The arrangement of claim 7 or 8, wherein said first and second subsampling clock signal frequencies are each less than half of said given data rate, and said bandpass filtered comb filtered signals exhibit a data rate which is equal to said given data rate; and further comprising:

means for combining said bandpass filtered comb filtered signals and said sampled data video signals to produce a fourth comb filtered signal corresponding to the other of said interleaved signal components of said sampled data video signals.

10. The arrangement of claim 9, further comprising an equalizing delay coupled between said source of sampled data video signals and said combining means for applying said sampled data video signals thereto.

11. The arrangement of claim 7 or 8, wherein the passbands of said bandpass filters are substantially equal to one MHz, and the frequencies of said subsampling clock signals are each equal to approximately 1.4 MHz.

* * * * *